United States Patent [19]

Schweitzer et al.

[11] Patent Number: 4,636,147

[45] Date of Patent: Jan. 13, 1987

[54] LUBRICATING-OIL PUMP FOR A MOTOR-DRIVEN APPARATUS

[75] Inventors: Karl Schweitzer, Waiblingen; Karl Nitschmann, Schorndorf; Hans Dolata, Waiblingen, all of Fed. Rep. of Germany

[73] Assignee: Andreas Stihl, Waiblingen, Fed. Rep. of Germany

[21] Appl. No.: 762,104

[22] Filed: Aug. 2, 1985

[30] Foreign Application Priority Data

Aug. 11, 1984 [DE] Fed. Rep. of Germany ....... 3429656

[51] Int. Cl.$^4$ .................. B25F 1/02; B23Q 11/12; F04B 49/00
[52] U.S. Cl. ...................... 417/214; 30/122; 30/123.4; 83/169; 184/15.1; 184/33
[58] Field of Search ............. 417/212, 214, 319, 500; 184/15.1, 33; 30/122, 123.3, 123.4, 381, 382, 383, 384, 385, 386, 387; 83/169

[56] References Cited

U.S. PATENT DOCUMENTS

| | | | |
|---|---|---|---|
| 2,070,203 | 2/1937 | Gregg | 417/500 X |
| 2,650,626 | 9/1953 | Kiekhaefer | 184/15.1 X |
| 2,810,409 | 10/1957 | Ibelle et al. | 30/122 |
| 3,448,829 | 6/1969 | Rauh et al. | 417/319 X |
| 3,809,185 | 5/1974 | Kobayashi et al. | 184/15.1 |
| 3,938,622 | 2/1976 | Densow | 184/15.1 |
| 4,231,716 | 11/1980 | Kubota et al. | 417/500 X |

FOREIGN PATENT DOCUMENTS

2042974 10/1980 United Kingdom ................ 30/386

Primary Examiner—Leonard E. Smith
Attorney, Agent, or Firm—Walter Ottesen

[57] ABSTRACT

A lubricating-oil pump is disclosed for a motor-driven apparatus such as a chain saw. The lubricating-oil pump delivers lubricating oil to a tool. The supply of lubricating oil from the oil pump to the tool can be interrupted. For example, in this way the flow of oil can be stopped when an accessory tool or the like is mounted on the motor-driven apparatus which requires no lubricating oil during operating.

11 Claims, 4 Drawing Figures

4,636,147

LUBRICATING-OIL PUMP FOR A MOTOR-DRIVEN APPARATUS

FIELD OF THE INVENTION

The invention relates to a lubricating-oil pump for a motor-driven apparatus such as a chain saw or the like. The pump delivers lubricating oil to the work tool of the apparatus. The invention also relates to a motor-driven apparatus which can be equipped with accessory work tools of which not all require lubricating oil during the operation thereof.

BACKGROUND OF THE INVENTION

Known motor-driven apparatus such as motor-driven chain saws where the saw chain moves around a guide bar are equipped with a lubricating-oil pump which in the operation of the chain saw continuously feeds lubricating oil for the chain links into a groove in the guide bar. Motor-driven apparatus of this type are also equipped with other attachments or tools, for example, with hedge trimmers, drills or the like which require no lubrication during operation. Further, it is known to equip motor-driven chain saws with sharpening devices which permit resharpening the cutting links with the motor running and the saw chain rotating.

When working with the known attachment tools which require no oil lubrication, it has been customary to drain the oil tank prior to mounting the attachment in order to avoid an unintentional oil leakage. For this purpose, the lubricating oil was collected in a suitable container to be saved for later use. In various applications the operator did not drain the oil tank so that oil continued to be fed without being needed; this resulted in additional oil consumption and environmental pollution.

SUMMARY OF THE INVENTION

It is an object of the invention to improve upon a motor-driven apparatus of the kind described above to eliminate the need for draining the oil tank and to avoid pumping unused lubricating oil by simple means.

A lubricating-oil pump for a motor-driven apparatus such as a chain saw or the like supplies lubricating oil to a work tool of the apparatus. The lubricating-oil pump includes a pump housing mounted on the apparatus; pump means mounted in the housing for pumping the lubricating oil to the work tool; and, interrupt means for selectively interrupting the flow of oil to the work tool.

Preferred embodiments and improvements as well as further advantages and essential details of the invention will become apparent from the subsequent description in conjunction with the drawing and from the claims.

BRIEF DESCRIPTION OF THE DRAWING

The invention will now be described with reference to the drawing wherein.

DESCRIPTION OF THE PREFERRED EMBODIMENTS OF THE INVENTION

Figure 1:
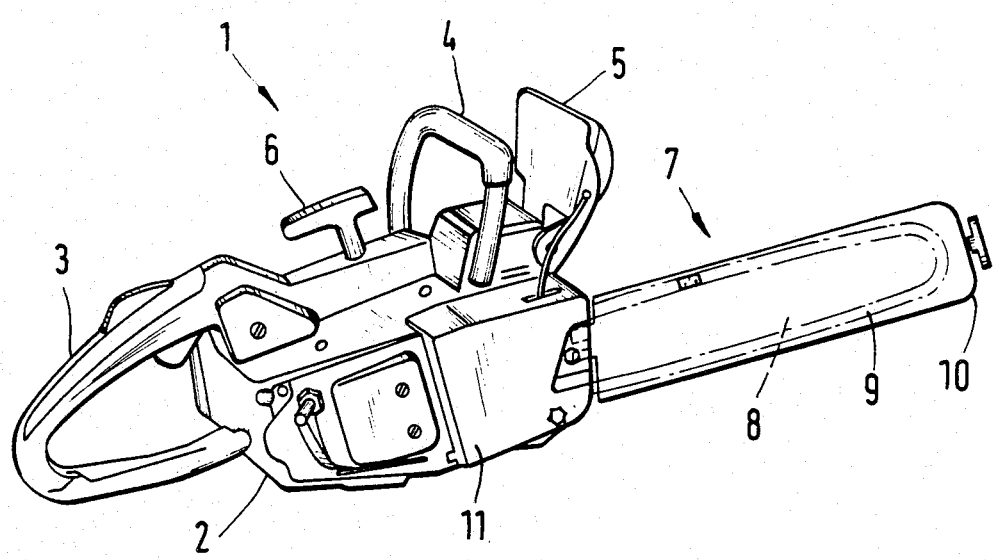
FIG. 1 is a perspective view of the motor-driven chain saw equipped with a lubricating-oil pump according to the invention.

The motor-driven apparatus illustrated in the drawing is configured as a motor-driven chain saw 1 and includes a drive motor (not shown) in a housing 2 provided with a rearward handle 3, a forward bail handle 4 and a safety shield 5. A starter grip 6 located on top of housing 2 serves to start the motor.

In addition, the motor-driven chain saw 1 includes a sword-like tool 7 having guide bar 8 around which a saw chain 9 is rotatably guided. Slipped over the tool 7 is a sharpening device 10 by means of which the cutting links of the saw chain 9 can be resharpened. Guide bar 8 is detachably secured to housing 2 in the region of the drive of saw chain 9 preferably by means of a threaded fastener connection. In this region the guide bar 8 is covered by a sprocket cover 11 of housing 2.

Figure 2:
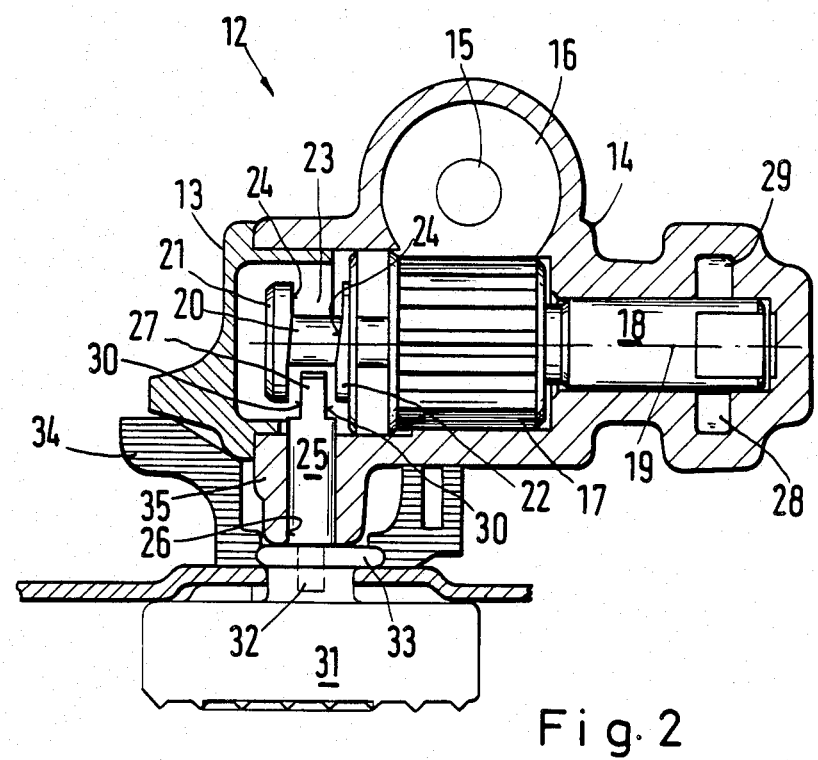
FIG. 2 is a partial section view of the region of the lubricating-oil pump of the motor-driven chain saw of FIG. 1 with a key inserted to stop the reciprocating movement of the piston of the lubricating-oil pump.
Figure 3:
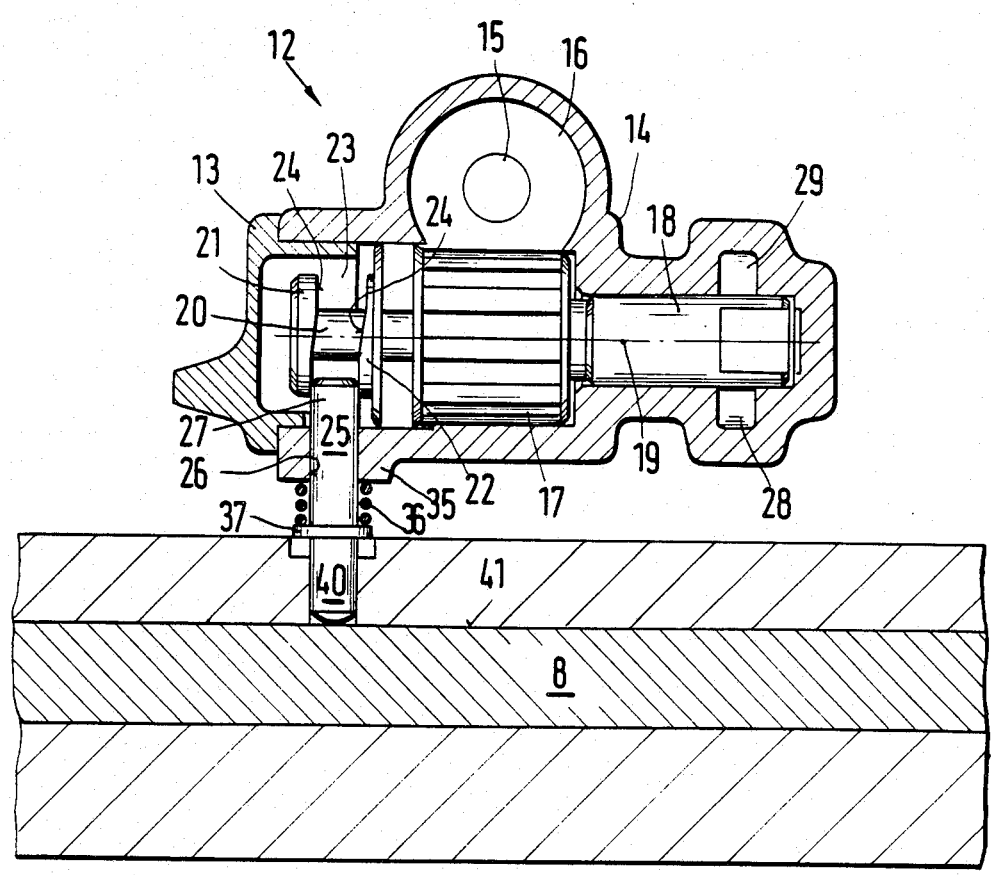
FIG. 3 is a partial section view of the region of the lubricating-oil pump of the motor-driven chain saw of FIG. 1 with a bar for guiding the saw chain attached and a control member urged into the operating position against the force of a spring whereby the piston of the lubricating-oil pump is released for reciprocatory motion; and, FIG. 4 is a partial section view of the region of the lubricating-oil pump area of the motor-driven apparatus similar to FIG. 3, however, with an attachement tool requiring no lubrication and the control member disengaged by spring force thereby interrupting the reciprocating motion of the piston of the lubricating-oil pump.
Figure 4:
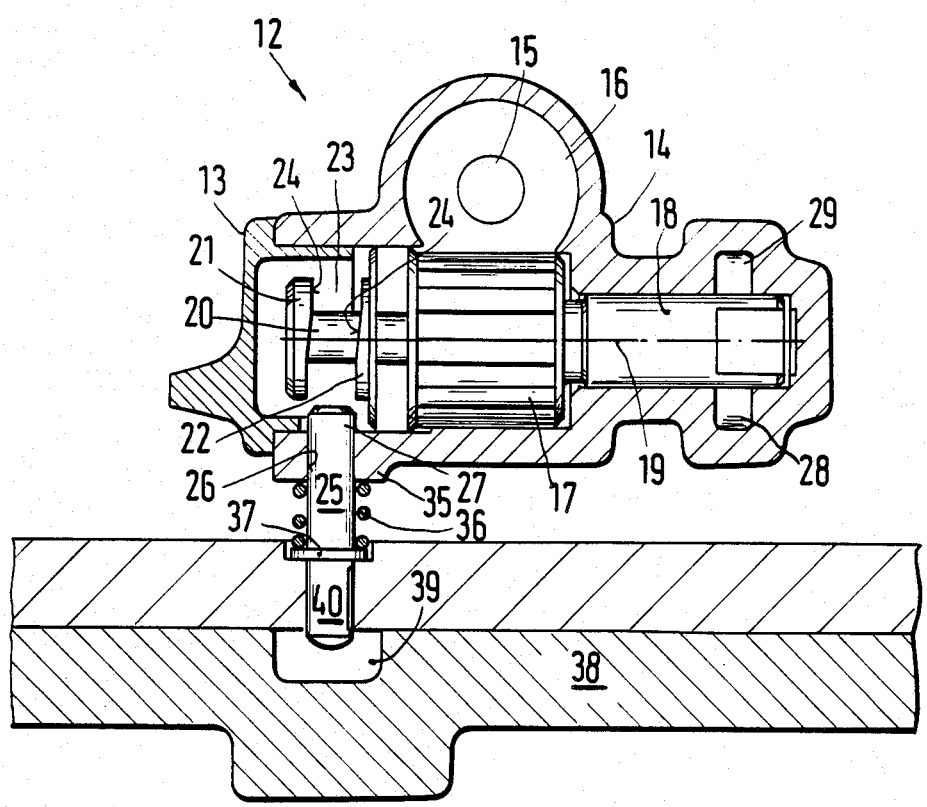

Motor-driven chain saw 1 includes a lubricating-oil pump 12 which, in the embodiments illustrated in FIGS. 2 to 4, is preferably configured as a reciprocating-piston lubricating-oil pump for delivering lubricating oil to saw chain 9 from an oil tank not shown.

Lubricating-oil pump 12 includes a housing 14 closed by a cover 13. The housing 14 accommodates a drive shaft 15 for a worm gear 15 which drives a gear 17. Gear 17 is mounted directly on a reciprocating piston 18 which rotates about an axis 19 together with gear 17. Two control discs 21, 22 are mounted on a shaft extension 20 on the side of gear 17 remote from piston 18. The two control discs 21, 22 are spaced from each other and conjointly form the lateral boundaries of a circumferential slot on shaft extension 20 of piston 18. The mutually adjacent inner surfaces of the two control discs 21, 22 are eccentric or suitably inclined to define control surfaces 24 serving as control cams.

A control member 25 is configured as a pin or bolt and snugly fits in a bore 26 of housing 14 transversely to axis 19 of piston 18. Control member 25 has a lug 27 which is shown projecting into peripheral slot 23. In the operating position, lug 27 is in sliding contact with control surfaces 24 of control discs 21, 22 and thereby causes a reciprocating movement of the piston 18 is driven to rotate about its axis 19. As a result of this reciprocating motion and the concurrent rotation of piston 18 with gear 17, piston 18 delivers, as it rotates and in accordance with the length of its stroke, lubricating oil from inlet 28 to outlet 29 of lubricating-oil pump 12. A conduit conducts the lubricating oil from outlet 29 to an oil groove in guide bar 8 of motor-driven chain saw 1.

The invention provides the option of stopping the oil feed from inlet 28 to outlet 29 and thus to the tool or saw chain 9. In a preferred embodiment, this is accomplished by discontinuing oil delivery at lubricating-oil pump 12 itself, particularly by disabling lubricating-oil pump 12, for which purpose the reciprocating motion of piston 18 rotating about its axis 19 is suitably interrupted. Halting the reciprocatory motion of piston 18 may be advantageously accomplished by shifting control member 25 out of peripheral slot 23 of piston 18 into an inactive or inoperative position whereat lug 27 and control surfaces 24 are operatively disconnected.

In the embodiment of FIG. 2, lug 27 of control member 25 is chamfered or flattened on two opposite sides so that open recesses 30 result. Rotating control member 25 about its longitudinal axis causes the same to be placed in its inoperative or inactive position as a result of which the movement of reciprocating piston 18 comes to a stop. Open recesses 30 have to be configured such that in the inactive position of control member 25, the width of lug 27 between the two control discs 21, 22 is less than the smallest spacing between the inclined control surfaces 24, so that, in the inoperative position, lug 27 is out of contact engagement with control surfaces 24 and, accordingly, cannot effect an axial stroke movement of piston 18 via control discs 21, 22.

For displacing or rotating control member 25, a key 31 may be suitably used which is adapted to be slipped onto a dog 32 provided on control member 25 at the end thereof remote from lug 27. For operative engagement with key 31, dog 32 may have at least one flat or it may be configured to have several flats. For this purpose, key 31 suitably has an eccentric extension 33 into which dog 32 engages and which is held in an appropriate undercut on housing 14 of lubricating-oil pump 12 such that key 31 is undetachably held on housing 14 in the inactive position of control member 25.

Thus, key 31 is suitably configured as an accessory such that it cannot be pulled out of its held position in housing 14 while the lubricating-oil feed is shut off, that is, with the operative connection between control member 25 and control discs 21, 22 of piston 18 interrupted. Specifically, the arrangement has been configured to permit key 31 to be pulled from housing 14 only with control member 25 in the operative position, that is, when lug 27 is in contact engagement with control surfaces 24 of control discs 21, 22 to enable piston 18 to reciprocate. Thus, when it is desired to interrupt the oil feed to resharpen the saw chain 9 or to attach another tool such as a hedge trimmer, the operator displaces the control member 25 by rotating the key inserted into housing 14. The displacement of control member 25 causes the operative connection in the region of control discs 21, 22 to be interrupted and the oil feed to be stopped. Key 31 remains inserted in housing 14; however, for the key to be removed, it has to be rotated back into the oil feed position when the device is to be used again as a saw. However, it is also possible to configure key 31 such that it remains inserted in housing 14 of lubricating-oil pump 12 in the operative position, that is, the oil feed position.

Moreover, key 31 may be advantageously configured so as to be exclusively suitable for tightening at least one fastening screw of guide bar 8, so that guide bar 8 of saw chain 9 can be finally mounted only by the use of this specific key 31 which s adapted to interrupt the delivery of lubricating oil. Further, key 31 may be advantageously configured such that it is required for mounting and removing the sharpening device 10 for saw chain 9. It is thereby ensured that the special key 31 is first used for mounting sharpening device 10 and is subsequently inserted into housing 14 for stopping the oil feed by displacing control member 25 into the inactive position. Following sharpening, key 31 is first used to bring control member 25 back into the operating position in which lubrication is resumed, and only in this position can the key be pulled out of housing 14 to be used for detaching sharpening device 10. This provides a certain constraint which ensures that oil lubrication is restored in every instance, that is, lubricating-oil pump 12 resumes its delivery when the motor-driven chain saw 1 starts its normal operation with saw chain 9.

It will also be seen from FIG. 2 that a protective cap 34 is provided on housing 14 of lubricating-oil pump 12. The protective cap 34 is preferably made of an elastomeric material and covers housing part 35 in which control member 25 is carried. On its side close to key 31, protective cap 34 has only a narrow opening for the insertion of key 31 thereby providing a tight seal. The small opening in protective cap 34 will close when the key 31 is pulled from housing 14 because of the resilience of the elastomeric material, so that in this position, too, a tight seal of the opening and a trouble-free shield against contamination are obtained.

In another advantageous embodiment, the feeding of lubricating oil may be stopped automatically by using the particular attachment tool for forcibly positioning control member 25. This is accomplished by directly configuring the accessory attachments or accessory tools, which are mounted on the motor-driven apparatus in lieu of the saw chain 9 and which require no lubrication, in such a manner that the oil feed is interrupted automatically by the mounting thereof. For this purpose, the embodiment of FIGS. 3 and 4 includes a spring 36 for resiliently biasing control member 25 of piston 18. In this embodiment, spring 36 is a helical spring and is mounted between housing part 35 and a collar 37 formed on control member 25. The control member 25 is journalled in housing part 35 so as to be axially displaceable. Spring 36 urges control member 25 outwardly into the inactive position so that lug 27 is outside of the peripheral slot 23 of control piston 18 (FIG. 4). In this embodiment, therefore, lug 27 is not operatively connected with control discs 21, 22 or control surfaces 24 of piston 18, as a result of which the reciprocating motion is interrupted and lubricating oil is not supplied. To enable control member 25 to be axially displaced into the inactive position by the force of spring 36, a wall 38 of the attachment tool requiring no lubricating oil has a recess 39 for receiving an accommodating the end portion 40 of control member 25 remote from lug 27.

By contrast, if guide bar 8 for saw chain 9 is mounted as shown in FIG. 3, end portion 40 of control member 25 will then abut against lateral surface 41 of guide bar 8 thereby causing control member 25 to be displaced axially in opposition to the force of spring 36 so that lug 27 engages peripheral slot 23 of piston 18. The operative connection with control discs 21, 22 is thereby established, so that with the operation of motor-driven chain saw 1, piston 18 will reciprocate causing lubricating oil to be supplied to saw chain 9. Thus, as guide bar 8 is mounted, control member 25 is automatically urged into its operating position. When the guide bar 8 is removed, the force of spring 36 will urge control member 25 into the inactive position thereby causing the delivery of lubricating oil to be interrupted.

It is understood that the foregoing description is that of the preferred embodiments of the invention and that various changes and modifications may be made thereto without departing from the spirit and scope of the invention as defined in the appended claims.

What is claimed is:

1. A lubricating-oil pump for a motor-driven apparatus such as a chain saw or the like to supply lubricating oil to a work tool of the apparatus, the lubricating-oil pump comprising:

a pump housing mounted on the apparatus;

pump means mounted in said housing for pumping the lubricating oil to the work tool, said pump means including: a piston having a longitudinal axis and being mounted in said housing so as to be both rotatable about said axis and displaceable along said axis; drive means for rotatably driving said piston to rotate the same about said longitudinal axis thereof; and, reciprocating means for imparting reciprocatory movement to said piston;

interrupt means for selectively interrupting the flow of oil to the work tool, said interrupt means being mounted on said housing for acting directly on said reciprocating means to interrupt said reciprocatory movement thereby stopping the delivery of oil to said work tool, said interrupt means including a control member for coacting with said reciprocating means, said control member being movable between a first position whereat said reciprocating means imparts a reciprocatory movement to said piston and a second position whereat said reciprocatory movement is interrupted and the supply of lubricating oil is stopped;

said reciprocating means including slot-like recess means formed in said piston in surrounding relationship to said longitudinal axis thereof, said slot-like recess means having a peripheral course about said axis so as to cause the mutually adjacent walls thereof to define respective cam surfaces; and, said interrupt means including a pin-like control member having a flat projection extending therefrom and into said recess means, said pin-like control member being rotatably mounted in said housing for rotational movement between said two positions such that said flat projection is in contact engagement with said cam surfaces when said pin-like control member is in said first position thereby imparting reciprocatory movement to said piston, said flat projection being dimensioned so as to cause the same to remain clear of said cam surfaces when said control member is rotated into said second position so that no reciprocatory movement is imparted to said piston.

2. A handheld, portable motor-driven apparatus such as a chain saw equipped with first and second detachable accessory work tools of which only the first accessory work tool requires lubricating oil during the operation thereof, the apparatus comprising:

a motor housing for detachably receiving said accessory tools; and, a lubricating-oil pump for supplying lubricating oil to said first accessory tool, said pump including:

a pump housing mounted in said motor housing;

pump means mounted in said pump housing for pumping the lubricating oil to said first accessary work tool, said pump means including: a piston having a longitudinal axis and being mounted in said housing so as to be both rotatable about said axis and displaceable along said axis;

drive means for rotatably driving said piston to rotate the same about said longitudinal axis thereof; and, reciprocating means for imparting reciprocatory movement to said piston;

interrupt means for interrupting the flow of oil when said first accessory work tool is detached from said motor housing, said interrupt means including: a control member movably mounted on said housing for movement between a first position whereat said control member coacts with said reciprocating means so as to cause the latter to impart a reciprocatory movement to said piston and a second position whereat said control member is clear of said reciprocating means and said reciprocatory movement of said piston is interrupted and the supply of lubricating oil is stopped; and, resilient means for imparting a resilient biasing force to said control member to resiliently hold the latter in said second position; and, said first accessory work tool being mounted on said housing so as to come into and be in contact engagement with said control member thereby moving said control member from said second position to said first position against the force of said resilient means and holding said control member in said first position so long as said first accessory work tool remains mounted on said housing.

3. A handheld, portable motor-driven apparatus such as a chain saw or the like having a work tool requiring lubricating oil during the operation thereof, the apparatus comprising:

a motor housing for receiving and holding said work tool; and, a lubricating-oil pump for supplying the lubricating oil to said work tool, said lubricating-oil pump including:

a pump housing mounted on the apparatus;

pump means mounted in said pump housing for pumping the lubricating oil to the work tool, said pump means including:

a piston having a longitudinal axis and being mounted in said housing so as to be both rotatable about said axis and displaceable along said axis; drive means for rotatably driving said piston to rotate the same about said longitudinal axis thereof; and, reciprocating means for imparting reciprocatory movement to said piston;

interrupt means for selectively interrupting the flow of oil to the work tool, said interrupt means being mounted on said pump housing for acting directly on said reciprocating means to interrupt said reciprocatory movement thereby stopping the delivery of oil to said work tool, said interrupt means including a control member for coacting with said reciprocating means, said control member being movable between a first position whereat said reciprocating means imparts a reciprocatory movement to said piston and a second posiiton whereat said reciprocatory movement is interrupted and the supply of lubricating oil is stopped;

said reciprocating means including a peripheral cam on said piston in surrounding relationship to said axis thereof; and, said control member having a control portion for being in contact with said cam while said control member is in said first position said control portion having an open recess formed thereon so as to cause said control portion to become disengaged from said cam when said control member is moved into said second position.

4. A lubricating-oil pump for a motor-driven apparatus such as a chain saw or the like to supply lubricating oil to a work tool of the apparatus, the lubricating-oil pump comprising:

a pump housing mounted on the apparatus;

pump means mounted in said housing for pumping the lubricating oil to the work tool, said pump means including: a piston having a longitudinal axis and being mounted in said housing so as to be both rotatable about said axis and displaceable along said axis; drive means for rotatably driving said piston to rotate the same about said longitudinal axis thereof; and, reciprocating means for imparting reciprocatory movement to said piston;

interrupt means for selectively interrupting the flow of oil to the work tool, said interrupt means being mounted on said housing for acting directly on said reciprocating means to interrupt said reciprocatory movement thereby stopping the delivery of oil to said work tool, said interrupt means including a control member for coacting with said reciprocating means, said control member being movable between a first position whereat said reciprocating means imparts a reciprocatory movement to said piston and a second position whereat said reciprocatory movement is interrupted and the supply of lubricating oil is stopped;

key means engageable with said control member for manually moving the same between said first and second positions;

holding means for non-removably holding said key means on said pump housing when said control member is in said second position; and, said control member being rotatably mounted in said housing so as to be rotatable between said first and second positions, and having a dog formed thereon; and, said key means being a knob-like member mountable onto said dog so as to transfer a rotational movement to said control member for moving the latter between said positions when said knob-like member is manually actuated, said holding means being an eccentric formed on said know-like member for holding the latter on said pump housing.

5. The lubricating-oil pump of claim 4, said eccentric of said knob-like member being configured so as to be removable from said apparatus when said control member is in said first position, said lubricating-oil pump further comprising an elastic protective cover having an opening formed therein to permit access to said control member, the elastic material of said cover being dimensioned so as to close said opening when said knob-like member is removed from said pump housing.

6. A handheld, portable motor-driven apparatus such as a chain saw equipped with first and second accessory work tools of which only the first accessory work tool requires lubricating oil during the operation thereof, the apparatus comprising:

a motor housing for detachably receiving said accessory work tools;

a lubricating-oil pump for supplying lubricating oil to said first accessory tool, said pump including:

a pump housing mounted in said motor housing;

pump means mounted in said pump housing for pumping the lubricating oil to said first accessory work tool, said pump means including: a piston having a longitudinal axis and being mounted in said housing so as to be both rotatable about said axis and displaceable along said axis; drive means for rotatably driving said piston to rotate the same about said longitudinal axis thereof; and, reciprocating means for imparting reciprocatory movement to said piston;

interrupt means for interrupting the flow of oil when said second accessory work tool is mounted on said motor housing, said interrupt means being mounted on said housing for acting directly on said reciprocating means to interrupt said reciprocatory movement thereby stopping the delivery of oil to said second accessory work tool;

said interrupt means including a control member for coacting with said reciprocating means, said control member being movable between a first position whereat said reciprocating means imparts a reciprocatory movement to said piston and a second position whereat said reciprocatory movement is interrupted and the supply of lubricating oil is stopped; and, said reciprocating means including a peripheral cam on said piston in surrounding relationship to said axis thereof; said control member being a pin-like member having a control portion on one end thereof for being in contact with said cam while said control member is in said first position and an abutment portion on the other end thereof; and, said interrupt means further including resilient means for imparting a resilient biasing force to said control member which tends to move the same into said second position; said first accessory work tool being mounted on said housing so as to come into and be in contact engagement with said abutment portion thereby moving said control member from said second position to said first position against the force of said resilient means and holding said control member in said first position so long as said first accessory work tool remains mounted on said housing.

7. The motor-driven apparatus of claim 6, said interrupt means further including a recess formed in said second accessory work tool, said recess being disposed in said second accessory work tool so as to accommodate said abutment portion therein when said second accessory work tool is mounted on said apparatus whereby said control member remains in said second position thereof under the force developed by said resilient means.

8. A lubricating-oil pump for a motor-driven apparatus such as a chain saw or the like to supply lubricating oil to a work tool of the apparatus, the lubricating-oil pump comprising:

a pump housing mounted on the apparatus;

pump means mounted in said housing for pumping the lubricating oil to the work tool, said pump means including: a piston having a longitudinal axis and being mounted in said housing so as to be both rotatable about said axis and displaceable along said axis; drive means for rotatably driving said piston to rotate the same about said longitudinal axis thereof; and, reciprocating means for imparting reciprocatory movement to said piston;

interrupt means for selectively interrupting the flow of oil to the work tool, said interrupt means being mounted on said housing for acting directly on said reciprocating means to interrupt said reciprocatory movement thereby stopping the delivery of oil to said work tool, said interrupt means including a control member for coacting with said reciprocating means, said control member being movable between a first position whereat said reciprocating means imparts a reciprocatory movement to said piston and a second position whereat said reciprocatory movement is interrupted and the supply of lubricating oil is stopped;

said reciprocating means including a peripheral cam on said piston in surrounding relationship to said axis thereof; and, said control member having a control portion for being in contact with said cam while said control member is in said first position, said control portion having an open recess formed thereon so as to cause said control portion to become disengaged from said cam when said control member is moved into said second position.

9. The lubricating-oil pump of claim 8, said control member having a pin-like configuration and being rotatably mounted in said housing for rotational movement between said first and second positions.

10. The lubricating-oil pump of claim 5, comprising key means engageable with said control member for manually moving the same between said first and second positions.

11. The lubricating-oil pump of claim 10, comprising holding means for non-removably holding said key means on said pump housing when said control member is in said second position.

* * * * *

UNITED STATES PATENT AND TRADEMARK OFFICE
CERTIFICATE OF CORRECTION

PATENT NO. : 4,636,147                  Page 1 of 2

DATED : January 13, 1987

INVENTOR(S) : Karl Schweitzer et al

It is certified that error appears in the above-identified patent and that said Letters Patent is hereby corrected as shown below:

On the title page, in the Abstract, in the last line: delete "operating." and substitute -- operation. -- therefor.

In column 2, line 36: delete "gear 15" and substitute -- gear 16 -- therefor.

In column 2, line 53: after "piston 18" add the word -- which --.

In column 3, line 59: delete "s" and substitute -- is -- therefor.

In column 4, line 45: delete "an" and substitute -- and -- therefor.

UNITED STATES PATENT AND TRADEMARK OFFICE
CERTIFICATE OF CORRECTION

PATENT NO. : 4,636,147  Page 2 of 2

DATED : January 13, 1987

INVENTOR(S) : Karl Schweitzer et al

It is certified that error appears in the above-identified patent and that said Letters Patent is hereby corrected as shown below:

In column 5, line 60: delete "accessary" and substitute -- accessory -- therefor.

In column 6, line 54: delete "posiiton" and substitute -- position -- therefor.

In column 6, line 62: delete "position" and substitute -- position, -- therefor.

In column 7, line 40: delete "know-" and substitute -- knob- -- therefor.

Signed and Sealed this

Eighth Day of September, 1987

Attest:

DONALD J. QUIGG

Attesting Officer

Commissioner of Patents and Trademarks